United States Patent [19]  [11]  4,283,318
Musa et al.  [45]  Aug. 11, 1981

[54] NON-AQUEOUS COMPOSITE GEL AND PROCESS FOR PRODUCTION THEREOF

[75] Inventors: Yoshikazu Musa; Isao Mune, both of Ibaraki, Japan

[73] Assignee: Nitto Electric Industrial Co., Ltd., Osaka, Japan

[21] Appl. No.: 191,619

[22] Filed: Sep. 29, 1980

[30] Foreign Application Priority Data

Sep. 29, 1979 [JP] Japan .............................. 54-126268

[51] Int. Cl.$^3$ ...................... C08L 91/08; C08K 5/03; C08L 7/00
[52] U.S. Cl. ........................ 260/28.5 B; 260/33.6 A; 260/33.6 AQ; 260/33.6 PQ; 260/33.6 UA; 260/739; 260/740; 260/744; 260/745; 525/215; 525/232; 260/27 R; 260/27 BB
[58] Field of Search .............. 260/33.6 PQ, 33.6 AQ, 260/33.6 UA, 28.5 B, 33.6 A, 739, 744, 745, 740

[56] References Cited

U.S. PATENT DOCUMENTS

| 2,627,938 | 2/1953 | Frohmader et al. | 260/33.6 PQ |
| 2,834,746 | 5/1958 | Salyer et al. | 260/33.6 PQ |
| 3,501,423 | 3/1970 | Tate et al. | 260/740 |
| 3,917,607 | 11/1975 | Crossland et al. | 260/33.6 A |
| 4,092,285 | 5/1978 | Leo et al. | 260/33.6 PQ |
| 4,153,589 | 5/1979 | Triolo | 260/33.6 AQ |

FOREIGN PATENT DOCUMENTS 1082549 9/1967 United Kingdom ............ 260/33.6 PQ

Primary Examiner—H. S. Cockeram
Attorney, Agent, or Firm—Sughrue, Mion, Zinn, Macpeak and Seas

[57] ABSTRACT

A non-aqueous composite gel and a process for the production thereof are described, said gel containing emulsified high boiling point hydrophilic liquid particles, said non-aqueous composite gel consisting of an O/O emulsion comprising from 15 to 99% by weight of a continuous phase composed of a rubber component and an oil component, and from 85 to 1% by weight of a dispersed phase composed of a high boiling point hydrophilic liquid wherein the rubber component is cross-linked. This non-aqueous composite gel can be used, for example, as a heat insulating material, especially to maintain low or high temperature environments, as a heat retaining material and as a hospital mat.

22 Claims, 1 Drawing Figure

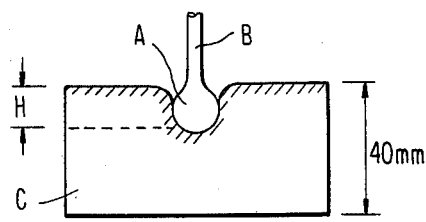

NON-AQUEOUS COMPOSITE GEL AND PROCESS FOR PRODUCTION THEREOF

BACKGROUND OF THE INVENTION

1. Field of the Invention

This invention relates to a non-aqueous composite gel of a novel structural form and a process for the production thereof, said gel comprising a continuous phase composed of a rubber component, as an elastomer component, and an oil component, and a dispersed phase composed of a high boiling point hydrophilic liquid wherein the rubber component is cross-linked. More particularly, it is concerned with a non-aqueous composite gel which, as a result of the presence of the dispersed phase of the high boiling point hydrophilic liquid particles which are emulsified in the form of an O/O emulsion in the gel structure, has unique physical, mechanical, and chemical characteristics, as compared with conventional gels.

2. Description of the Prior Art

Relatively soft aqueous gels comprising various water-soluble organic polymeric compounds, such as starch, cellulose derivatives, gelatin, casein, polyvinyl alcohol, polyvinyl pyrrolidone, polyacrylic acid or polyethylene oxide, are known. In almost all such aqueous gels, the water-soluble polymeric compounds absorb water, swelling the gel, whereby the water forms a continuous phase.

These conventional aqueous gels, however, suffer from the disadvantage that at relatively high water contents the strength of the aqueous gel is lowered and the storage stability is generally poor, and when they are allowed to stand in air, the water contained therein easily vaporizes. Furthermore, they have the defect that when they are stored at temperatures below 0° C., the whole gel freezes, becoming very hard and brittle and, as a result, such gels entirely lose their softness.

Japanese Patent Publication No. 18409/72 discloses the preparation of a highly elastic gel composed of an elastic block copolymer and certain oils or higher fatty acids with the gel produced having good softness and high elasticity. This oily gel, however, has a rubber-like impact resilience; it deforms upon application of stress but returns to its original state upon removal of the stress. Accordingly, it has very poor stress dispersing characteristics, as will be explained in more detail later. Furthermore, although it is stable at room temperature, it is inferior in thermal stability; for instance, at a temperature range of from 80° C. to 150° C., difficulty is encountered in retaining its original shape and dimensions, and the oily gel tends to flow and lose its original shape.

It has also been proposed to obtain a hydrous gel by dispersing water particles in a continuous phase of an oily gel which is prepared by casting a W/O (water-in-oil) emulsion in order to provide good stress dispersing characteristics, as described in Japanese Patent Publication No. 48895/77, corresponding to U.S. Pat. No. 4,102,807. This hydrous gel, however, is not sufficiently satisfactory in thermal stability and other characteristics.

Additionally, a cross-linking type hydrous gel has been proposed having a dispersed phase composed of water particles, as described in Japanese Patent Application (OPI) No. 65785/77 (the term "OPI" as used herein refers to a "published unexamined Japanese patent application")). This gel, however, is not sufficiently satisfactory in that specific cross-linking conditions are required in order to prevent the vaporization of water particles during the cross-linking, e.g., application of pressure in an autoclave.

SUMMARY OF THE INVENTION

An object of this invention is to provide a non-aqueous composite gel of a novel structural form which is prepared from an O/O emulsion comprising a continuous phase composed of a rubber component and an oil component and a dispersed phase composed of a high boiling point hydrophilic liquid, which gel is substantially stabilized against heat.

Another object of this invention is to provide a gel product which has desirable stress dispersing characteristics as a result of the presence of a dispersed phase of spherical high boiling point hydrophilic liquid particles which are finely emulsified in a continuous phase (because the high boiling point hydrophilic liquid has a lower surface tension than water); that is, a gel product which easily deforms upon the application of stress but which completely returns to its original state in from about 1 to 3 minutes after the removal of the stress, which can be used, for example, as a gel mat to prevent the congestion of blood in a seriously wounded patient who cannot move his body, particularly at his hips, during prolonged hospitalization.

Still another object of this invention is to provide a process for easily producing a non-aqueous composite gel, the dispersed particles of which have reduced vaporization properties in comparison with water by using a high boiling point hydrophilic liquid, such as ethylene glycol, and which is stabilized against heat.

This invention provides a non-aqueous composite gel comprising from 15 to 99% by weight of a continuous phase composed of a cross-linked rubber component derived from a rubber containing an unsaturated double bond or bonds in the molecules thereof, and an oil component, and from 85 to 1% by weight of a dispersed phase composed of a high boiling point hydrophilic liquid which is uniformly emulsified and dispersed by use of an emulsifier, wherein the rubber component is stabilized against heat by the cross-linking. Therefore, a gel product can be obtained from non-aqueous composite gel which is substantially stable at both room temperature and elevated temperatures.

Furthermore, this invention provides a process for producing such a non-aqueous composite gel containing emulsified high boiling point hydrophilic liquid particles, said process comprising dissolving a rubber component containing an unsaturated double bond or bonds in the molecules thereof in an excess of an oil component (at room temperature or while heating) to form a solution, adding a cross-linking agent at temperatures below the decomposition temperature thereof and an emulsifier to the solution, uniformly emulsifying a high boiling point hydrophilic liquid in the solution system to form an O/O (oil-in-oil) emulsion comprising 15 to 99% by weight of a continuous phase composed of the rubber component and the oil component and 85 to 1% by weight of a dispersed phase of the emulsified high boiling point hydrophilic liquid, and cross-linking the cross-linking agent to form the non-aqueous composite gel.

BRIEF DESCRIPTION OF THE DRAWING

The drawing shows an apparatus for measuring the stress dispersing effect of non-aqueous composite gels according to this invention.

DETAILED DESCRIPTION OF THE INVENTION

Elastomer materials containing a cross-linkable unsaturated double bond or bonds in the molecules thereof can be used as the rubber component for the formation of the continuous phase of the present non-aqueous composite gel. These include natural rubber and synthetic rubbers such as an isoprene rubber, butadiene rubber, styrene-butadiene rubber, acrylonitrile-butadiene rubber, chloroprene rubber, styrene-chloroprene rubber, isobutyrene-isoprene rubber, and styrene-isoprene rubber.

As the oil component, which is the other component used in the formation of the continuous phase, high boiling point oily substances which have low evaporation properties over the temperature range at which the gel is produced or used, have good compatibility with the rubber component, and are liquid at room temperature (e.g., machine oil, cylinder oil, rosin oil, naphthene oil, paraffin-based oil, etc.) are preferably used. Additionally, mixtures prepared by adding to such oily substances which exhibit an oily form upon heating (e.g., paraffin wax having a melting point of 120° C. or less, and waxy low molecular weight polyethylene having a melting point of 150° C. or less) can also be used as the coil component of this invention.

The use of the oil component in an amount of 100 parts by weight per from 4 to 30 parts by weight of the rubber component is effective for the formation of the continuous phase of the present non-aqueous composite gel. The amount of the rubber component used is determined principally based on the rubber used, the liquid particle content, and the desired softness of the final gel product.

Preferred cross-linking agents which are used in cross-linking the rubber component in the continuous phase are peroxide cross-linking agents and vulcanizing agents. Examples of such peroxide cross-linking agents are various organic peroxides such as methyl ethyl ketone peroxide, cyclohexanone peroxide, cumene hydroperoxide, dicumyl peroxide, acetyl peroxide, lauroyl peroxide, benzoyl peroxide, tert-butylperoxy-2-ethyl hexanoate, tert-butylperoxy benzoate, peracetic acid, polyperoxides (alternative copolymers of vinyl monomer and oxygen) and the like. If necessary, they may be dissolved or dispersed in dioctyl phthalate, dibutyl phthalate, toluene, silicon oil or the like and used in a paste form. In addition, if necessary, cross-linking accelerators can be added, including amines suh as N,N-dimethylaniline, N,N-dimethylbenzylamine, tri-2,4,6-dimethylaminomethylphenol, tetraethylenepentamine and triethylenediamine, and metal compounds such as cobalt naphthalene and tin octanate.

Vulcanizing agents and vulcanization accelerators and activators which are generally used in the vulcanization of rubbers are useful as a vulcanizing agent for use in this invention. Examples of such compounds are sulfur, tetramethylthiuram disulfide, tetraethylthiuram disulfide, tetrabutylthiuram disulfide, tetramethylthiuram monosulfide, dipentamethylenethiuram tetrasulfide, mercaptobenzothiazole, piperidinepentamethylene dithiocarbonate, zinc dimethyldithiocarbamate, zinc diethyldithiocarbamate, zinc di-n-butyldithiocarbamate, sodium dimethyldithiocarbamate, sodium diethyldithiocarbamate, copper dimethyldithiocarbamate, zinc white, magnesium oxide, stearic acid and the like.

While the amount of the cross-linking agent used varies depending upon the type of the cross-linking agent, the operation conditions, etc., it is generally suitable to use an amount of from 0.05 to 15 parts by weight per 100 parts by weight of the rubber component. The optimum amount is determined according to the relation of the toughness of the final gel product to its softness.

An age resistor and/or an antioxidant can be added to the rubber component or oil component of this invention in order to prevent the deterioration of the gel by heat, oxidation, light, etc. A reinforcing filler, a coloring pigment, a dye, a perfume and the like can also be added, if desired.

The emulsifier as used in this invention should have the properties of forming a dispersed phase of innumerable emulsified hydrophilic liquid particles in the continuous phase composed of the rubber component and the oil component so as to maintain the form of an O/O emulsion in a stable fashion. Nonionic surface active agents are especially effective as this type of emulsifier. Specific examples include polyethylene glycol alkylphenyl ether, polyethylene glycol alkyl ether, polyethylene glycol aliphatic acid esters, polypropylene glycol polyethylene glycol ether, sorbitan aliphatic acid esters, polyethylene glycol sorbitan aliphatic acid esters, N-polyethylene glycol alkylamine, aliphatic acid diethanolamide, sugar aliphatic acid esters, etc. Suitable commercial grades of such nonionic surface active agents are, for example, NOIGEN EA, NOIGEN ET, and SORGEN produced by Dai-ichi Kogyo Seiyaku Co., Ltd., PROFAN and IONET S produced by Sanyo Chemical Industries, Ltd., and TWEEN and EMANON produced by Kao Atlas Co., Ltd.

The high boiling point hydrophilic liquid as used in this invention is emulsified in the oil component with the rubber component dissolved therein with the aid of the emulsifier and dispersed therein as particles having an average diameter of from 0.1 to 20$\mu$, and preferably from 0.1 to 5$\mu$. Useful high boiling point hydrophilic liquids are high boiling point alcohols or organic acids which have a boiling point of at least 100° C. and are capable of dissolving at least 5% by weight of water. Examples of such liquids are monohydric alcohols such as n-butyl alcohol, isobutyl alcohol, n-amyl alcohol, hexyl alcohol, etc., polyhydric alcohols such as ethylene glycol, glycerol, polyether polyol (for example, SUNNIX PP-200 produced by Sanyo Chemical Industries, Ltd.), etc., alicyclic alcohols such as cyclohexanol, etc., aromatic alcohols such as benzyl alcohol, heterocyclic alcohols such as furfuryl alcohol, etc., carboxylic acids such as acetic acid, butyric acid, etc., oxy acids such as lactic acid, etc., and the like.

The amount of the emulsifier used in emulsifying the high boiling point hydrophilic liquid to the desired particle diameter varies depending upon the amount of the high boiling point hydrophilic liquid contained in the non-aqueous composite gel having the desired characteristics and the type thereof. In general, a suitable amount of the emulsifier is from 0.01 to 20 parts by weight per 100 parts by weight of the high boiling point hydrophilic liquid.

One preferred way of preparing the non-aqueous composite gel of this invention comprises: dissolving the rubber component and desired additives in an excess amount of the oil component at room temperature or while heating, to form a solution; adding the cross-linking agent (e.g., the curing agent, the vulcanizing agent or the like) to the solution at a temperature below the decomposition temperature thereof and the nonionic surface active agent as an emulsifier, and gradually (e.g., dropwise) adding the high boiling point hydrophilic liquid to the above prepared mixture to uniformly emulsify therein and form an O/O emulsion. This results in the formation of a stable heterogeneous system comprising a continuous phase composed of the oil component with the rubber component dissolved therein, and a dispersed phase composed of the high boiling point hydrophilic particles. Thereafter, by heating the heterogeneous system to a temperature above the decomposition temperature of the cross-linking agent to gel the continuous phase, a non-aqueous composite gel is obtained which contains emulsified high boiling point hydrophilic particles.

In an example of such a preparation, a mixture containing a predetermined proportion of rubber component and the oil component is dissolved at room temperature or by heating to from 50° to 150° C. This is, if necessary, carried out in an atmosphere of an inert gas, such as nitrogen, etc. The cross-linking of the rubber component is achieved by heating to cause cross-linking (or vulcanization) at from 60° C. to 170° C. for from 5 minutes to 240 minutes, and preferably at from 100° C. to 150° C. for from 30 minutes to 180 minutes, although optimum conditions may vary depending upon the particular cross-linking agent and rubber component. In this case, it is preferred to employ a high boiling point hydrophilic liquid having a boiling point which is higher by at least 30° C. than the heating temperature.

In this invention, each of the steps of the above example of preparation can be somewhat modified or replaced. For example, when a thermally stable emulsifier is used in the emulsifier addition step, it can be added in advance to the mixture of the rubber component and the oil component. Alternatively, the high boiling point hydrophilic liquid with the emulsifier dissolved or dispersed therein can be added to the solution prepared from the rubber component and the oil component. The amount of the high boiling point hydrophilic liquid that can be emulsified can vary from an extremely small amount to about 85% by weight. When the liquid is added in greater amounts, the stability of the non-aqueous composite gel becomes poor, so that phase inversion may take place between the phase composed of the oil component with the rubber component dissolved therein and the phase composed of the high boiling point hydrophilic liquid, thus preventing gelation.

Accordingly, the non-aqueous composite gel of this invention envelops the high boiling point hydrophilic liquid particles in the emulsified high boiling point hydrophilic liquid dispersed phase in a proportion of from 85 to 1% by weight, and the proportion of the continuous phase composed of the cross-linked rubber component and the oil component is limited to from 15 to 99% by weight.

The non-aqueous composite gel of this invention can be cast into various forms in the O/O emulsion form prior to the gelation; that is, the O/O emulsion can be cast into a mold, extruded, or coated on the surface of a material such as a fabric, paper or releasing paper by using a coating apparatus and the thus-cast product is cross-linked by cross-linking or vulcanization to provide a gel product which is thermally stable.

According to the method of this invention, high boiling point hydrophilic liquid particles constituting the dispersed phase in the gel product can be uniformly dispersed as fine particles having diameters of 0.1 to 20μ. Even when the non-aqueous composite gel is allowed to stand at room temperature for a long period of time, it is stable and the loss of weight is very small. Furthermore, even when it is heat-treated at 100° C. for 10 minutes for the purpose of sterilization and disinfection, almost no deformation is observed and the loss of weight is very small. If the gel product is covered with a plastic film, almost no reduction in the weight is observed.

The diameter of the dispersed high boiling point hydrophilic liquid particle can be made small and the number of the particles can be increased, compared with using water, since the high boiling point hydrophilic liquid has a lower boiling point and a smaller surface tension than water. In the present gel product, therefore, the plasticizing effect of the particles contained therein against the stress exerted from outside is significant, and it exhibits excellent stress dispersing characteristics.

By the "stress dispersing characteristics" is meant the property that when a gel product is pushed with, for example, a finger, the stress is not concentrated only at the place where it is pushed with a finger, but dispersed in the interior of the gel product, resulting in the deformation of the gel product and when the stress is removed, the deformation is gradually released and the gel product returns to its original shape. These stress dispersing characteristics are measured in the examples as described later by use of a transmission type stress measuring instrument.

Because of these characteristics, the non-aqueous composite gel of this invention can be used, in particular, as a mat for use in a wheelchair or a mat for a seriously wounded patient who cannot move his body to effectively prevent the congestion of blood at his hips. Additionally, since the present gel product does not freeze and has softness even at −20° C. and furthermore it has the properties of maintaining its original shape at temperatures of as high as 100° C., of being useful as an insulating material (cold and heat retention material), a heat retaining material or the like, and its utilization value is very high.

The following examples are given to illustrate this invention in greater detail. It is to be noted, however, that these examples do not in any way limit the scope of this invention. All parts in these examples are by weight.

EXAMPLE 1

A 1 liter four-necked flask equipped with a stirrer of good efficiency, a reflux condenser, a dropping funnel and an opening for nitrogen gas introduction was charged with 100 parts of fluid paraffin (Smoil P-55, trademark for a product of Matsumura Oil Research Laboratory) having a viscosity of 22 centipoises (20° C.) and 8 parts of a synthetic isoprene rubber (IR-10, trademark for a product of Kuraray Isoprene Chemical Co., Ltd.), and with stirring in the N$_2$ gas stream they were heated to 85° C. and thoroughly dissolved to obtain a viscous solution.

This viscous solution was then cooled to 40° C., and 0.3 part of a paste prepared by dispersing benzoyl peroxide (BPO) in dioctyl phthalate (Niper BO, trademark for a product of Nippon Oils & Fats Co., Ltd.; BPO content: about 50%) was added thereto and dispersed therein by stirring. Then 5 parts of sugar aliphatic acid ester (DK ester, an emulsifier produced by Dai-ichi Kogyo Seiyaku Co., Ltd.) was added and 10 parts of ethylene glycol was then dropwise added over a period of about 30 minutes to fomr an O/O emulsion containing fine particles of ethylene glycol.

The thus-obtained white emulsion was cast into a mold having a depth of 40 mm, a length of 100 mm and a width of 100 mm, subjected to cross-linking processing at 120° C. for 2 hours and then removed therefrom to obtain a non-aqueous composite gel according to this invention.

This non-aqueous composite gel did not freeze and had softness even after being maintained at −20° C. for 1 hour. Even after it was heated at 100° C. for 1 hour, no deformation in the gel was observed and the weight loss was only 3%.

The stress dispersing characteristics of the non-aqueous composite gel containing ethylene glycol particles was measured by means of a transmission type stress measuring instrument, a rheometer (Model RUD-J, a product of Fuji Rika Kogyo K.K.). The measuring method will be described with reference to the accompanying drawing. A rod (B) with a steel ball (A) having a diameter of 12 mm is interlocked with the main body of a rheometer (not shown). The steel ball is caused to gradually sink into the gel (C), and the relationship between the penetration distance (H) of the steel ball and the stress exerted on the rod (B) is measured.

In the case of the gel according to this invention, when the penetration distance was 15 mm and the steel ball was buried in the gel, the repulsive stress exerted on the rod (B) was as low as about 45 g. When the steel ball was removed, the gel completely returned to its original form in about 2 minutes.

For comparison, a comparative gel without ethylene glycol particles was produced; 0.3 part of Niper BO (a peroxide cross-linking agent) was added to a solution of 100 parts of fluid paraffin and 8 parts of a synthetic isoprene rubber maintained at 40° C. and the resulting mixture was fully stirred and dispersed, cast into a mold and subjected to a cross-linking processing at 120° C. for 2 hours to produce an oily gel having a volume of 100×100×40 mm.

The stress dispersing characteristics were measured in the same manner as above. It was found that the stress exerted on the rod (B) at a steel ball penetration distance of 15 mm was about 75 g, which is very high impact resilience. When the steel ball was removed from the gel, the gel instantaneously returned to the original form, thus showing the characteristics of a highly elastic gel.

The above properties show that the non-aqueous composite gel according to this invention is thermally stable and is soft and tough. The stress dispersing characteristics appear to be attributable to the fact that innumerable fine particles of ethylene glycol in the non-aqueous composite gel deform easily upon application of external force and exhibit the function of absorbing or dispersing the external force.

A gel mat utilizing these characteristics is useful as a mat for use in wheelchair to prevent the congestion of blood.

EXAMPLE 2

In the same manner as in Example 1, 18 parts of an isoprene rubber (IR-10, trademark for a product of Kuraray Isoprene Chemical Co., Ltd.) was dissolved in 100 parts of fluid paraffin (Smoil P-350, trademark for a product of Matsumura Oil Research Laboratory) having a viscosity of 180 centipoises (20° C.). The resulting solution was cooled down to 40° C., and 1.0 part of lauroyl peroxide was added thereto and thoroughly stirred to disperse therein. Thereafter, 10 parts of sorbitan aliphatic acid ester (Solgen, an emulsifier produced by Dai-ichi Kogyo Seiyaku Co., Ltd.) was added thereto and then 30 parts of lactic acid was added gradually dropwise over a period of about 1 hour to produce an O/O emulsion containing fine particles of lactic acid.

The thus-obtained white emulsion was cast into a mold having a depth of 4 mm, a length of 100 mm, and a width of 100 mm, subjected to cross-linking processing at 100° C. for 2 hours, and then removed therefrom to obtain a sheet of a non-aqueous composite gel according to the invention.

Even after the gel sheet was maintained at 100° C. for 1 hour, no deformation of the gel sheet was boserved.

In order to measure the stress dispersing characteristics of the non-aqueous composite gel containing lactic acid particles, a non-aqueous composite gel with a thickness of 40 mm was obtained by utilizing the same mold as used in Example 1, and applying cross-linking processing under the same conditions as above. By use of the same rheometer as used in Example 1, the repulsive stress was measured. The repulsive stress of the gel was found to be about 20 g.

For comparison, a comparative gel without lactic acid particles was produces as: 1.0 part of lauroyl peroxide was added to a solution of 100 parts of fluid paraffin and 18 parts of isoprene rubber and dispersed therein by thorough stirring, and the resulting dispersion was cast into the same mold as used in Example 1, and subjected to cross-linking processing at 100° C. for 2 hours, to produce an oily gel having a volume of 100×100×40 mm. The repulsive stress of the thus-obtained gel was about 60 g, the stress dispersing characteristics were low, and the repulsive elasticity was high.

It can be seen from the experimental results that the non-aqueous composite gel containing lactic acid particles obtained according to this invention is thermally stable and has excellent stress dispersing characteristics. A gel sheet utilizing these characteristics is useful, for example, in preventing the pain caused by a shoe sore which is associated with sweat and heat.

EXAMPLE 3

In the same manner as in Example 1, 20 parts of a butadiene rubber (BR, trademark for a product of Japan Synthetic Rubber Co., Ltd.) was dissolved in 100 parts of fluid paraffin (Smoil P-55, trademark for a product of Matsumura Oil Research Laboratory) having a viscosity of 22 centipoises (20° C.) and the resulting solution was cooled down to 40° C.

Separately, a mixture of 1 part of dipentamethylenethiuram tetrasulfide (Soxinol TRA, trademark for a product of Sumitomo Chemical Company, Limited), 1 part of zinc dimethyldithiocarbamate (Soxinol PZ, trademark for a product of Sumitomo Chemical Company, Limited), 2 parts of zinc stearate and 12 parts of the above fluid paraffin was passed through a colloid mill to produce a vulcanizing agent solution dispersed in the fluid paraffin. This vulcanizing agent solution in the amount of 3 parts was added to the above-prepared solution and dispersed therein by thorough stirring. Thereafter, 3 parts of polypropylene glycol polyethylene glycol ether (Epan, trademark for a product of Dai-ichi Kogyo Seiyaku Co., Ltd.) was added and then 20 parts of glycerol was gradually dropwise added over a period of about 1 hour to produce an O/O emulsion containing fine particles of glycerol.

The thus-obtained white emulsion was cast into a mold having a depth of 40 mm, a length of 100 mm, and a width of 100 mm, subjected to a vulcanization processing at 130° C. for 1 hour, and then removed therefrom to obtain a non-aqueous composite gel according to this invention.

Even after this gel was maintained at 100° C. for 1 hour, no deformation was observed. When this gel was kept at 70° C. for 4 hours and then covered with a bath towel and allowed to stand in the air at 20° C., it retained suitable warmness. The time required until the surface temperature reached 30° C. was 6 hours, and therefore the gel had good heat retaining properties.

In order to measure the stress dispersing characteristics of the non-aqueous composite gel containing glycerol particles, a non-aqueous composite gel having a thickness of 40 mm was obtained by utilizing the same mold as used in Example 1 and applying the heat vulcanization processing under the above-described conditions. The repulsive stress of the thus-obtained gel was measured by use of the same rheometer as used in Example 1. It was found to be 120 g.

For comparison, a comparative gel containing no glycerol particles was produced: 3 parts of the same vulcanizing agent solution as used above was added to a solution of 100 parts of fluid paraffin and 20 parts of butadiene rubber at 40° C. and dispersed therein by well stirring to obtain a well dispersed composition. This composition was cast in the same mold as used in Example 1 and subjected to a heat vulcanization processing at 130° C. for 1 hour to produce an oily gel having a volume of 100×100×40 mm. The repulsive stress of this oily gel was 190 g, which is a very high repulsive resilience.

It can thus be seen from the results that the non-aqueous composite gel containing glycerol particles obtained by the method of this invention is thermally stable and has excellent stress dispersing characteristics. A gel mat utilizing these characteristics is useful as a heat retaining mat.

EXAMPLE 4

In the same manner as in Example 1, 8 parts of natural rubber (pale crape First Grade, kneaded for 7 minutes) was dissolved in 100 parts of fluid paraffin (produced by Wako Pure Chemical Industries, Ltd.) having a viscosity of 170 centipoises (20° C.) and the resulting solution was cooled down to 40° C.

Separately, a mixture of 4 parts of sulfur, 3 parts of dibenzothiazyl disulfide (Soxinol DM, trademark for a product of Sumitomo Chemical Company, Limited), 6 parts of stearic acid, 30 parts of zinc white and 100 parts of the above fluid paraffin was passed through a colloid mill to produce a vulcanizing agent solution dispersed in the fluid paraffin. This vulcanizing agent solution in the amount of 7 parts was added to the above-prepared solution and dispersed therein by thorough stirring. Thereafter, 3 parts of polyethylene glycol alkylphenyl ether (Noigen EA, trademark for a product of Dai-ichi Kogyo Seiyaku Co., Ltd.) was added and then 5 parts of benzyl alcohol was gradually dropwise added over a period of about 20 minutes, to produce an O/O emulsion of fine particles containing benzyl alcohol.

A cloth was fully soaked in the white emulsion as obtained above, subjected to a heat vulcanization processing at 130° C. for 1 hour and then removed therefrom to obtain a sheet of non-aqueous composite gel according to this invention.

Even after the thus-obtained gel sheet was kept at 100° C. for 1 hour, no deformation was observed. Furthermore, the gel sheet exhibited strong adhesive properties to metal, glass, etc., and it was an effective insulator for heat.

In order to measure the stress dispersion characteristics of the non-aqueous composite gel containing these benzyl alcohol particles, a non-aqueous composite gel having a thickness of 40 mm was obtained by utilizing the same mold as used in Example 1 and applying a heat vulcanization treatment under the above conditions. The repulsive stress of the non-aqueous composite gel was measured by use of the same rheometer as used in Example 1, and was found to be about 50 g.

For comparison, a comparative gel containing no benzyl alcohol was produced: 7 parts of the above vulcanizing agent solution was added to a solution of 100 parts of fluid paraffin and 8 parts of natural rubber at 40° C. and dispersed therein by thorough stirring. The thus-obtained composition was cast into the same mold as used in Example 1 and subjected to a heat treatment at 130° C. for 1 hour to produce an oily gel having a volume of 100×100×40 mm. The repulsive stress of this gel was about 90 g, the stress dispersing characteristics were low, and the repulsive stress was high.

It can be seen from these results that the non-aqueous composite gel containing benzyl alcohol particles obtained by the method of this invention is thermally stable and has excellent stress dispersing chcaracteristics. A gel sheet utilizing these characteristics is useful as a heat insulating sheet.

While the invention has been described in detail and with reference to specific embodiments thereof, it will be apparent to one skilled in the art that various changes and modifications can be made therein without departing from the spirit and scope thereof.

What is claimed is:

1. A substantially stable non-aqueous composite gel containing emulsified high boiling point hydrophilic liquid particles, said composite gel consisting of an O/O emulsion comprising from 15 to 99% by weight of a continuous phase composed of a cross-linked rubber component and an oil component, said rubber component being derived from rubber containing an unsaturated double bond or bonds in the molecules thereof, and from 85 to 1% by weight of a dispersed phase composed of a high boiling point hydrophilic liquid uniformly emulsified in the continuous phase by an emulsifier.

2. A composite gel as in claim 1 wherein the cross-linked rubber is derived from a rubber selected from the group consisting of natural rubber, isoprene rubber, butadiene rubber, styrene-butadiene rubber, acrylonitrile-butadiene rubber, chloroprene rubber, styrene-chloroprene rubber, isobutyrene-isoprene rubber, and styrene-isoprene rubber.

3. A composite gel as in claim 1 wherein the oil component is selected from the group consisting of machine oil, cylinder oil, rosin oil, naphthene oil, and paraffin-based oil.

4. A composite gel as in claim 3 wherein the oil component additionally comprises a paraffin wax having a melting point of 120° C. or less or a waxy low molecular weight polyethylene having a melting point of 150° C. or less.

5. A composite gel as in claim 1 wherein the oil component is present in an amount of 100 parts by weight per from 4 to 30 parts by weight of the rubber component.

6. A composite gel as in claim 1 wherein the dispersed phase has an average particle diameter of from 0.1 to 20μ.

7. A composite gel as in claim 6 wherein the dispersed phase has an average particle diameter of from 0.1 to 5μ.

8. A composite gel as in claim 1 wherein the high boiling point hydrophilic liquid has a boilng point of at least 100° C.

9. A composite gel as in claim 1 wherein the concentration of emulsifier is from 0.1 to 20 parts by weight per 100 parts by weight of the high boiling point hydrophilic liquid.

10. A process for producing a non-aqueous composite gel containing emulsified high boiling point hydrophilic liquid particles, said process comprising dissolving a rubber component containing an unsaturated double bond or bonds in the molecules thereof in an excess amount of an oil component to form a solution, adding a cross-linking agent at a temperature below the decomposition temperature thereof and an emulsifier to the solution, uniformly emulsifying a high boiling point hydrophilic liquid in the resulting solution to form an O/O emulsion comprising from 15 to 99% by weight of a continuous phase composed of the rubber component and the oil component and from 85 to 1% by weight of a dispersed phase of the emulsified high boiling point hydrophilic liquid, and cross-linking the rubber component to achieve the gelation thereof.

11. A process as in claim 10 wherein the rubber containing an unsaturated double bond or bonds in the molecules thereof is selected from the group consisting of natural rubber, isoprene rubber, butadiene rubber, styrene-butadiene rubber, acrylonitrile-butadiene rubber, chloroprene rubber, styrene-chloroprene rubber, isobutyrene-isoprene rubber, and styrene-isoprene rubber.

12. A process as in claim 10 wherein the oil component is selected from the group consisting of machine oil, cylinder oil, rosin oil, naphthene oil, and paraffin-based oil.

13. A process as in claim 10 wherein the oil component additionally comprises a paraffin wax having a melting point of 120° C. or less or a waxy low molecular weight polyethylene having a melting point of 150° C. or less.

14. A process as in claim 10 wherein the oil component is used in an amount of 100 parts per from 4 to 30 parts by weight of the rubber component.

15. A process as in claim 10 wherein the dispersed phase is emulsified to obtain an average particle diameter of from 0.1 to 20μ.

16. A process as in claim 10 wherein the dispersed phase is emulsified to obtain an average particle diameter of from 0.1 to 5μ.

17. A process as in claim 10 wherein the high boiling point hydrophilic liquid has a boiling point of at least 100° C.

18. A process as in claim 10 wherein the concentration of emulsifier is from 0.1 to 20 parts by weight per 100 parts by weight of the high boiling point hydrophilic liquid.

19. A process as in claim 10 wherein the cross-linking agent is used in an amount of from 0.05 to 15 parts by weight per 100 parts by weight of the rubber component.

20. A process as in claim 10 wherein the cross-linking of the rubber component is achieved by heating at from 60° C. to 170° C. for from 5 to 240 minutes.

21. A process as in claim 20 wherein the cross-linking of the rubber component is achieved by heating at from 100° C. to 150° C. for from 30 to 180 minutes.

22. A process as in claim 20 or 21 wherein the boiling point of the high boiling point hydrophilic liquid is at least 30° C. higher than the heating temperature.

* * * * *